(12) United States Patent
Hoshino et al.

(10) Patent No.: US 6,880,985 B2
(45) Date of Patent: Apr. 19, 2005

(54) OPTICAL MODULE

(75) Inventors: Yasuji Hoshino, Hamamatsu (JP);
Yoshihisa Warashina, Hamamatsu (JP);
Shogo Iyama, Hamamatsu (JP);
Hajime Takeyama, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/459,702

(22) Filed: Jun. 12, 2003

(65) Prior Publication Data

US 2004/0033033 A1 Feb. 19, 2004

(30) Foreign Application Priority Data

Jun. 14, 2002 (JP) .................................... P2002-174768

(51) Int. Cl.⁷ .............................................. G02B 6/36
(52) U.S. Cl. ...................................... 385/93; 385/147
(58) Field of Search ............................ 385/27, 28, 31, 385/33–35, 38–39, 88–94

(56) References Cited

U.S. PATENT DOCUMENTS

| 4,687,285 A | * | 8/1987 | Hily et al. ..................... 385/93 |
| 4,842,391 A | * | 6/1989 | Kim et al. ..................... 385/35 |
| 5,504,828 A | * | 4/1996 | Cina et al. ..................... 385/33 |
| 2003/0142914 A1 | * | 7/2003 | Jewell et al. ................. 385/49 |
| 2004/0005124 A1 | * | 1/2004 | Gallup et al. ................. 385/88 |

FOREIGN PATENT DOCUMENTS

JP          08-234058          9/1996

* cited by examiner

Primary Examiner—Akm Enayet Ullah
(74) Attorney, Agent, or Firm—Morgan, Lewis & Bockius LLP

(57) ABSTRACT

In optical module 10, light emitted from laser diode (hereinafter referred to as "LD") 42 is collimated into parallel light beam by ball lens 44 and then travels through ball lens 26 to be focused on core 104 of optical fiber 100. Since the light passing between ball lenses 44 and 26 is the parallel light beam as described above, allowance is enlarged for axial misalignment between the optical axes of ball lens 44 and ball lens 26. This enables the light from LD 42 to be focused on core 102 of optical fiber 100 even if there occurs axial misalignment between the optical axes of optical fiber 100 and LD 42 due to a factor resulting from fitting of ferrule 102 into sleeve 14 or the like. Accordingly, there is no need for alignment in a work of mounting optoelectronic device 28, i.e., LD 42 in housing 12.

7 Claims, 2 Drawing Sheets

OPTICAL MODULE

BACKGROUND OF THE INVENTION

1. Field of the Invention

The present invention relates to an optical module for optically coupling an optoelectronic component to an optical fiber, which is used mainly in optical communications.

2. Related Background Art

A conventionally known optical module for optically coupling an optoelectronic component to an optical fiber is, for example, the one described in Japanese Patent Application Laid-open No. 08-234058. The optical module described in this Application is of such structure that in a housing a sleeve with a ferrule of an optical fiber fitted therein is disposed through a SELFOC lens or the like on the optical axis of an optoelectronic component. In the optical module of this type, the following alignment is achieved in a work of fixing the optoelectronic component to the housing with UV-curing adhesive or the like. Namely, in the case of the optoelectronic component being a light emitting device, the light emitting device is activated to emit light in the coupled state with the optical fiber, the light emitting device is moved relative to the housing while monitoring the light power coupled into the optical fiber, and the light emitting device is fixed at a position where a desired output is obtained. Likewise, in the case of the optoelectronic component being a photodetector, the photodetector is moved relative to the housing while monitoring the incident light on the photodetector, and the photodetector is fixed in position.

SUMMARY OF THE INVENTION

However, the optical module as described above requires a device dedicated to the alignment and also takes a long time for the alignment. Therefore, these factors were barriers to cost reduction of the optical module.

The present invention has been accomplished in view of the above circumstances and an object of the invention is therefore to provide an optical module that removes the need for the alignment in mounting of the optoelectronic component.

In order to achieve the above object, an optical module according to the present invention comprises an optoelectronic device wherein a first lens is disposed on an optoelectronic component to be optically coupled to an optical fiber; a second lens located between the first lens and a core of the optical fiber on an optical path in an optically coupled state of the optoelectronic component and the optical fiber and having a focus positioned on the core of the optical fiber; and a housing accommodating the optoelectronic device and the second lens and having a sleeve in which a ferrule of the optical fiber is fitted.

In the optical module according to the present invention, where the optoelectronic component is a light emitting device such as a laser diode, light emitted from the light emitting device is collimated into parallel light beam (including light of nearly parallel bead; the same will also apply to the description hereinafter) by the first lens and the parallel light beam travels through the second lens to be focused thereby on the core of the optical fiber. Since the light passing between the first lens and the second lens is the parallel light beam as described above, tolerance is enlarged for axial misalignment between the optical axes of the first lens and the second lens. This enables the light from the light emitting device to be focused on the core of the optical fiber even if there occurs axial misalignment between the optical axes of the optical fiber and the light emitting device due to a factor resulting from the fitting between the ferrule and the sleeve, for example. In the case where the optoelectronic component is a photodetector such as a photodiode, light emerging from the optical fiber is collimated into parallel light beam by the second lens and the parallel light beam travels through the first lens to be focused thereby on the photodetector. Accordingly, just as in the case of the optoelectronic component being the light emitting device, it becomes feasible to focus the light from the optical fiber on the photodetector even if there occurs axial misalignment between the optical axes of the optical fiber and the photosensitive component due to a factor resulting from the fitting between the ferrule and the sleeve, for example. In either case of the optoelectronic component being the light emitting device or the photodetector, as described above, there is no need for alignment in the work of mounting the optoelectronic device or optoelectronic component in the housing, thus enabling the cost reduction of the optical module. Furthermore, it becomes feasible to apply the simple configuration of the fitting between the ferrule and the sleeve to the coupling between the optical fiber and the housing.

In the optical module according to the present invention, the housing is preferably one integrally molded of resin. This configuration makes it feasible to form the housing accurately and efficiently.

In the optical module according to the present invention, the second lens is preferably a ball lens. This configuration requires no allowance for inclination of the optical axis of the lens and permits the second lens to be readily mounted in the housing.

In the optical module according to the present invention, the optoelectronic component can be a light emitting device or a photodetector as described above.

DESCRIPTION OF THE PREFERRED EMBODIMENTS

The preferred embodiments of the optical module according to the present invention will be described below in detail with reference to the drawings.

[First Embodiment]

Figure 1:
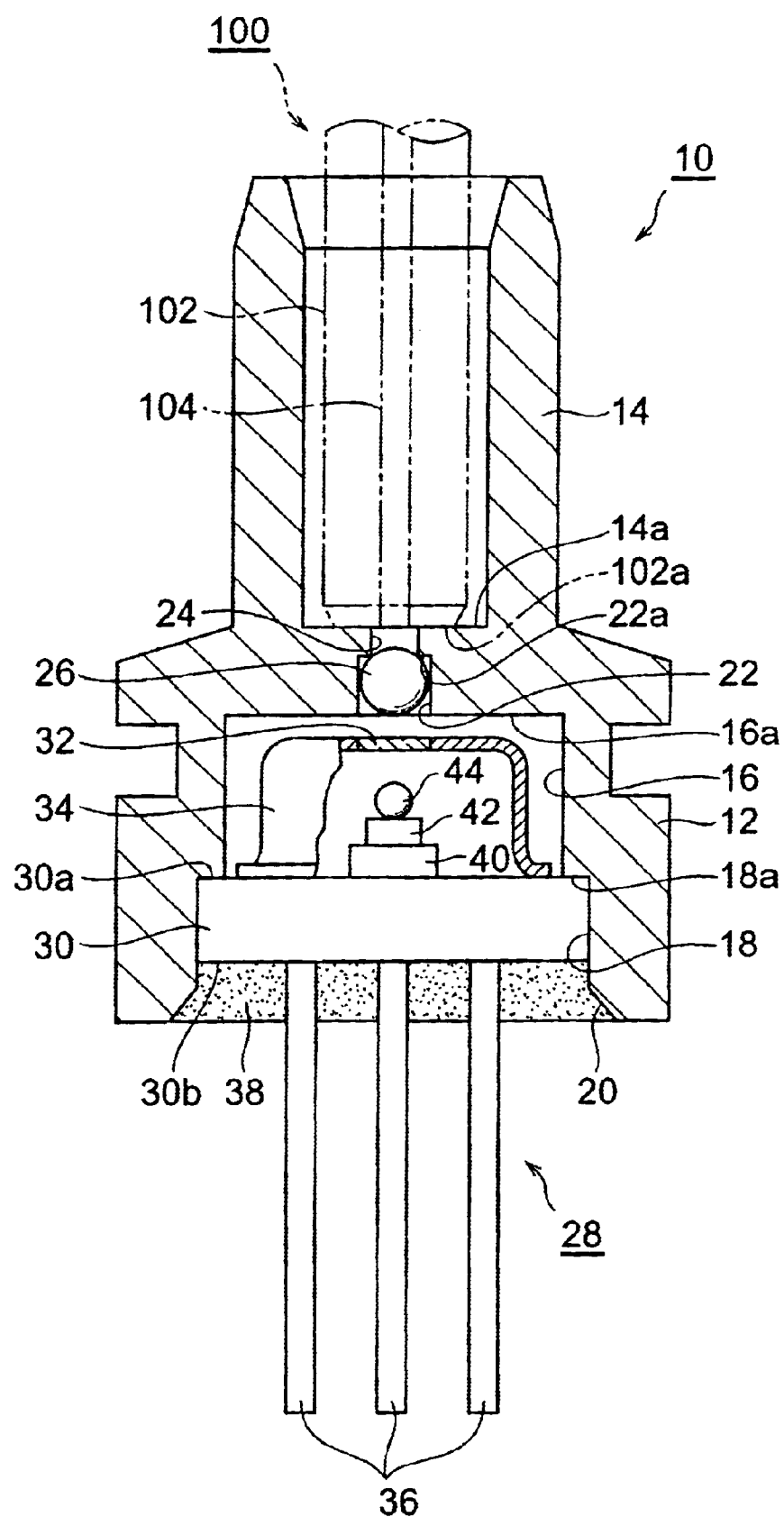
FIG. 1 is a sectional view showing a first embodiment of the optical module according to the present invention.

As shown in FIG. 1, optical module 10 has housing 12 integrally molded of epoxy resin. Sleeve 14 with ferrule 102 of optical fiber 100 being fitted therein is formed at one end of housing 12, and bottom surface 14a inside sleeve 14 functions as a ferrule stopper in contact with ferrule end face 102a. The optical fiber 100 is a multi-mode optical fiber for optical communications and has core 104 with the core diameter $\Phi$ of 50 $\mu$m.

On the other hand, recess 16 of a circular cross section is formed at the other end of housing 12. Larger-diameter recess 18 of a circular cross section having the diameter greater than that of recess 16 is formed on the aperture side of the recess 16, and inner chamfer 20 is made at an aperture portion of this larger-diameter recess 18. Smaller-diameter recess 22 of a circular cross section having the diameter smaller than that of the recess 16 is formed in bottom surface 16a of recess 16 and a light passing hole 24 is formed between the bottom surface 22a of the smaller-diameter recess 22 and the bottom surface 14a inside the sleeve 14.

In this housing 12, the center axis of larger-diameter recess 18 and the center axis of smaller-diameter recess 22 fall within concentricity deviation of ±5 $\mu$m with respect to the center axis of sleeve 14, and the bottom surface 18a of larger-diameter recess 18 and the bottom surface 22a of smaller-diameter recess 22 fall within parallelization deviation of ±5 μm with respect to the bottom surface 14a in the sleeve 14. The parallelization deviation ±5 μm means that the deviation of the distance between two said planes is less than ±5 μm over said planes. Since the housing 12 is an integrally molded product of epoxy resin as described above, it can be efficiently formed with such high accuracy. The MTM (Metal Injection Mold) technology using stainless steel or the like may be applied to the integral molding of housing 12.

A ball lens (second lens) 26 with the diameter (Φ of 1.2 mm made of BK-7 is pressed into the smaller-diameter recess 22 of housing 12. This press fitting of the ball lens 26 can be readily achieved, because there is no need for making allowance for inclination of the optical axis of the lens. The ball lens 26 has the focal length (the distance between the center and the focus of the lens) of 880 μm and the center of the ball lens 26 is positioned 880 μm apart from the bottom surface 14a of the sleeve 14 by the contact between the peripheral surface of the ball lens 26 and the opening edge of the light passing hole 24 on the smaller-diameter recess 22 side. Namely, the focus of ball lens 26 is located on core 104 at ferrule end face 102a of optical fiber 100.

The housing 12 accommodates optoelectronic device 28 in a space made by the recess 16 and larger-diameter recess 18. The optoelectronic device 28 has stem 30 made of Kobar in a disk shape, and Kobar cap 34 provided with transparent window 32 is fixed in a hermetic condition to one end face 30a of the stem 30 by welding. A plurality of leads 36 for electrical connection extend outward from the other end face 30b of stem 30. For placing the optoelectronic device 28 into housing 12, the stem 30 is pressed into the larger-diameter recess 18 until one end face 30a of stem 30 comes to contact the bottom surface 18a of larger-diameter recess 18, whereby the cap 34 is located in the recess 16. This press fitting of stem 30 can be readily achieved, because inner chamfer 20 is provided at the aperture portion of larger-diameter recess 18.

After the stem 30 is pressed into the larger-diameter recess 18, resin 38 such as UV-curing adhesive or the like is filled in the remaining space of the larger-diameter recess 18 to adhere the stem 30 to larger-diameter recess 18. This is done for the purpose of preventing the optoelectronic device 28 from being displaced relative to the housing 12 when stress due to soldering or the like is exerted on the leads 36.

In the hermetic space inside cap 34 of optoelectronic device 28, monitoring photodiode 40 is die-bonded on one end face 30a of stem 30, and surface-emitting laser diode (light emitting device) 42 is die-bonded on the monitoring photodiode 40. Furthermore, ball lens (first lens) 44 having the diameter Φ of 610 μm, the refractive index of 1.9, and the focal length of 318 μm is fixed on laser diode 42.

In general, the optoelectronic device 28 of this type can be constructed so that the axial misalignment between the center axis of stem 30 and the optical axis of the laser diode 42 falls with ±50 μm. The fix of ball lens 44 is carried out through a concave lens guide (not shown) formed on laser diode 42 by etching. Therefore, the axial misalignment is vanishingly small between the optical axes of laser diode 42 and ball lens 44, so that the focus of ball lens 44 is accurately positioned at the light emitting part of laser diode 42.

Now let us describe the optical coupling between optical fiber 100 and laser diode 42 of optoelectronic device 28 by the optical module 10 constructed as described above.

The general flow of light in the optical module 10 is as follow. Namely, the light emitted from laser diode 42 of optoelectronic device 28 is collimated into parallel light beam by ball lens 44, because the focus of ball lens 44 is located at the light emitting part of laser diode 42. This parallel light beam travels through transparent window 32 provided in cap 34, to enter the ball lens 26. The parallel light beam entering the ball lens 26 is condensed by ball lens 26 and travels through light passing hole 24 provided in housing 12, to be focused on core 104 (at the position of the focus of ball lens 26) at ferrule end face 102a of optical fiber 100.

Supposing a beam spread half angle of laser diode 42 is 9°, because the focal length of ball lens 44 is 318 μm, the beam size of the parallel light beam is Φ100 μm (=318 μm×tan 9°×2). On the other hand, the numerical aperture of optical fiber 100 is 0.2, and the focal length of ball lens 26 is 880 μm. Under such circumstances, when the parallel light beam after the collimation by ball lens 44 enter within the range of ±176 μm (=880 μm×0.2) with respect to the lens center of ball lens 26, the light can be focused on the core 104 at the ferrule end face 102a of optical fiber 100.

The maximum axial misalignment due to the press fitting of stem 30 of optoelectronic device 28 is 10 μm between the center axis of stem 30 and the center axis of larger-diameter recess 18, and the maximum axial misalignment due to the press fitting of ball lens 26 is 10 μm between the optical axis of ball lens 26 and the center axis of smaller-diameter recess 22. Furthermore, in the optoelectronic device 28, the maximum axial misalignment is 50 μm between the center axis of stem 30 and the optical axis of laser diode 42. Under the above conditions, because the beam size of the parallel light beam is Φ100 μm the maximum positional deviation between the ball lenses 44 and 26 is 120 μm (=100 μm/2+10 μm+10 μm+50 μm) in the direction perpendicular to the optical axis of the parallel light beam. Accordingly, the parallel light beam can be incident into the range of ±176 μm with respect to the lens center of ball lens 26, whereby the light can be focused on core 104 at ferrule end face 102a of optical fiber 100.

Incidentally, with allowance for the accuracy of ±5 μm for the inside diameter of sleeve 14, because the concentricity deviation is ±5 μm and the parallelization deviation ±5 μm in housing 12, the maximum axial misalignment is 15 μm (=5 μm+5 μm+5 μm) between the optical axes of optical fiber 100 and ball lens 26. This appears as a positional deviation in the direction perpendicular to the optical axis of the light focused by ball lens 26. The image magnification at the focal point of ball lens 26 is 2.5 (=880 μm/318 μm) from the ratio of the focal lengths of ball lenses 26 and 44. Supposing the radius of the beam size of laser diode 42 is 2 μm, the size of the image at the focal point of ball lens 26 is 5 μm (=2 μm×2.5). Therefore, the maximum positional deviation is 20 μm (=15 μm+5 μm) including the axial misalignment between the optical axes of optical fiber 100 and ball lens 26, so that the light can enter the optical fiber 100 with the core diameter Φ of 50 μm.

Since in optical module 10 the light passing between ball lenses 44 and 26 is the parallel light beam as described above, tolerance is enlarged for axial misalignment between the optical axes of ball lens 44 and ball lens 26. This enables the light from laser diode 42 to be focused on core 104 at ferrule end face 102a of optical fiber 100 even if there occurs axial misalignment between the optical axes of optical fiber 100 and laser diode 42 due to a factor resulting from the fitting of ferrule 102 into sleeve 14 or the like. Accordingly, the optical coupling between laser diode 42 and optical fiber 100 is implemented without the need for alignment in the work of mounting optoelectronic device 28 in housing 12, and this enables cost reduction of optical module 10.

[Second Embodiment]

Figure 2:
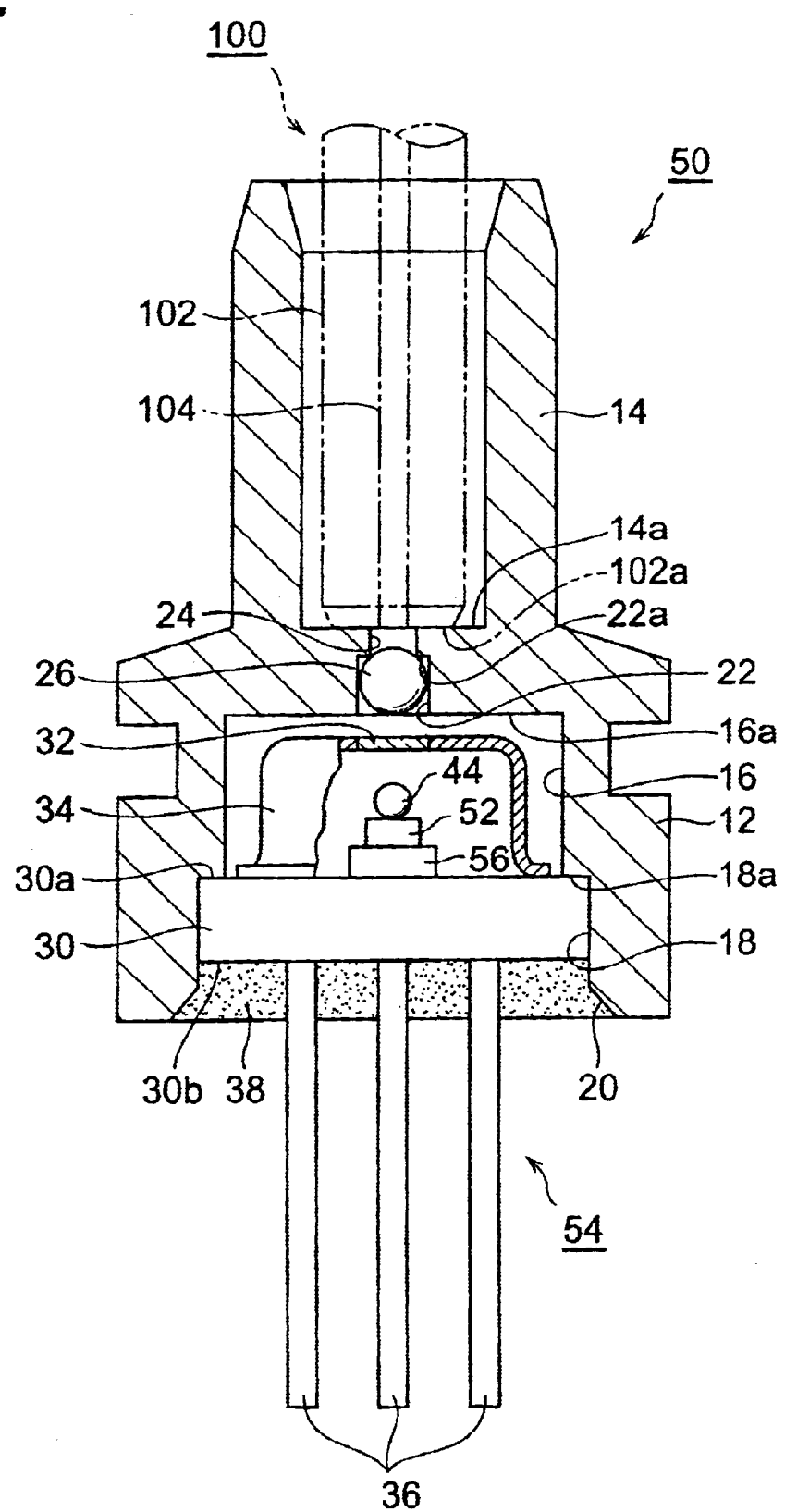
FIG. 2 is a sectional view showing a second embodiment of the optical module according to the present invention.

Another embodiment of the optical module according to the present invention will be described below with reference to the drawing. In the optical module according to the present invention, the optoelectronic device applicable thereto may be one having a photodetector such as a photodiode, or one having an optical waveguide element. The optical module 50 shown in FIG. 2 is one to which optoelectronic device 54 having photodiode 52 is applied. In the description hereinafter, identical or similar portions to those in the above embodiment will be denoted by the same reference symbols, without redundant description thereof.

In optical module 50, as shown in FIG. 2, optoelectronic device 54 with photodiode (photodetector) 52 is housed in housing 12. In the hermetic space inside cap 34 of optoelectronic device 54, sub-mount 56 is die-bonded on one end face 30a of stem 30, and photodiode 52 is die-bonded on this sub-mount 56. Furthermore, ball lens 44 having the diameter Φ of 610 μm, the refractive index of 1.9, and the focal length of 318 μm is fixed on photodiode 52.

The optoelectronic device 54 of this type can also be constructed so that the axial misalignment falls within ±50 μm between the center axis of stem 30 and the optical axis of photodiode 52, just as in the case of the aforementioned optoelectronic device 28. The fix of ball lens 44 is carried out through a polyimide lens guide (not shown) provided on photodiode 52 in a semiconductor process. Therefore, the axial misalignment is vanishingly small between the optical axes of photodiode 52 and ball lens 44, so that the focus of ball lens 44 is accurately positioned at photosensitive area of photodiode 52.

Now let us describe the optical coupling between optical fiber 100 and photodiode 52 of optoelectronic device 54 by the optical module 50 constructed as described above.

The general flow of light in the optical module 50 is as follows. Namely, the light emerging from optical fiber 100 travels through light passing hole 24 provided in housing 12, to enter the ball lens 26. The incident light into the ball lens 26 is collimated into parallel light beam by ball lens 26, because the focus of ball lens 26 is located on core 104 at ferrule end face 102a of optical fiber 100. This parallel light beam travels through transparent window 32 provided in cap 34, to enter ball lens 44. The parallel light beam entering the ball lens 44 is focused on the photosensitive area of photodiode 52 (at the position of the focus of ball lens 44) by ball lens 44.

Since the optical module 50 is constructed using the ball lens 26 having the diameter Φ of 1 mm and the focal length of 734 μm, where allowance is made for the numerical aperture of 0.2 in optical fiber 100, the beam size of the parallel light beam after the collimation by ball lens 26 is Φ294 μm (=734 μm×0.2×2). Incidentally, with allowance for the accuracy of ±5 μm for the inside diameter of sleeve 14, because the concentricity deviation is ±5 μm and the parallelization deviation ±5 μm in the housing 12, the maximum axial misalignment is 15 μm (=5 μm+5 μm+5 μm) between the optical axes of optical fiber 100 and ball lens 26. This axial misalignment results in the positional deviation of 40 μm (=15 μm/734 μm×2000 μm (the distance between the lens center of ball lens 26 and photodiode 52)) in the direction perpendicular to the optical axis in the photodiode 52.

With allowance for the maximum axial misalignment of 50 μm between the center axis of stem 30 and the optical axis of photodiode 52 in optoelectronic device 54 and for the maximum axial misalignment of 10 μm between the center axis of stem 30 and the center axis of larger-diameter recess 18 due to the press fitting of stem 30, therefore, the maximum positional deviation between ball lenses 26 and 44 is 247 μm (=294 μm/2+40 μm+50 μm+10 μm) in the direction perpendicular to the optical axis of the parallel light beam, because the beam size of the parallel light beam is Φ294 μm. Since the ball lens 44 of optoelectronic device 54 has the diameter Φ of 610 μm, it is feasible to focus the parallel light beam in the range of ±247 μm with respect to the lens center of ball lens 44.

Since in this case the end part of ball lens 44 is used, there arises concern about the problem of aberration. However, the problem of aberration can be solved by increasing the size of the photosensitive area of photodiode 52 to approximately Φ100 μm (even the photosensitive area of Φ100 μm can operate at 1–2 Gbps and can be applied to use for optical communications), whereby the light can be focused on the photosensitive area of photodiode 52. The image magnification on the photosensitive area of photodiode 52 is 0.4 (=318 μm/734 μm) from the ratio of the focal lengths of the ball lenses 44 and 26, and this means that the system is a reduction system and influence of image conversion can be ignored.

Since in optical module 50 the light passing between ball lenses 26 and 44 is the parallel light beam as described above, tolerance is enlarged for axial misalignment between the optical axes of ball lens 26 and ball lens 44. This enables the light form optical fiber 100 to be focused on the photosensitive area of photodiode 52 even if there occurs axial misalignment between the optical axes of optical fiber 100 and photodiode 52 due to a factor resulting from the fitting of ferrule 102 into sleeve 14 or the like. Accordingly, the optical coupling can be implemented between photodiode 52 and optical fiber 100, without the need for alignment in the work of mounting optoelectronic device 54 in housing 12, and this enables cost reduction of optical module 50.

As described above, in the optical module according to the present invention, that obviates the need for alignment in mounting of the optoelectronic component.

What is claimed is:

1. An optical module comprising:

an optoelectronic device wherein a first lens is disposed on an optoelectronic component configured to be optically coupled to an optical fiber;

a second lens disposed between the first lens and a core of the optical fiber, and on an optical path between the optoelectronic component and the optical fiber, in an optically coupled state in which the optoelectronic component is optically coupled to the optical fiber, said second lens having a focus located on the core of the optical fiber when in the optically coupled state; and a housing accommodating the optoelectronic device and the second lens and having a sleeve in which a ferrule of the optical fiber is fitted, wherein the first lens is fixedly coupled to the optoelectronic component, and wherein the second lens is fixedly coupled to the housing.

2. The optical module according to claim 1, wherein the housing is one integrally molded of resin.

3. The optical module according to claim 1, wherein the second lens is a ball lens.

4. The optical module according to claim 1, wherein the optoelectronic component is a light emitting device.

5. The optical module according to claim 1, wherein the optoelectronic component is a photodetector.

6. The optical module according to claim 1, wherein the first lens has an optical axis substantially aligned with an optical axis of the optoelectronic component, and wherein the second lens has an optical axis substantially aligned with a center axis of the sleeve.

7. The optical module according to claim 1, wherein the first lens is fixed directly to the optoelectronic component, and wherein the second lens is held directly by the housing.

* * * * *